Feb. 13, 1968    R. H. BENNETT, JR    3,368,318
THERMALLY EXPANDABLE BARRIER STRUCTURE
Filed June 5, 1964    3 Sheets-Sheet 1

INVENTOR.
ROBERT H. BENNETT JR.
BY
Nilsson, Robbins & Anderson
— ATTORNEYS —

Feb. 13, 1968  R. H. BENNETT, JR  3,368,318

THERMALLY EXPANDABLE BARRIER STRUCTURE

Filed June 5, 1964  3 Sheets—Sheet 2

INVENTOR.
ROBERT H. BENNETT JR
BY
Nilsson, Robbins & Anderson
- ATTORNEYS -

United States Patent Office 3,368,318
Patented Feb. 13, 1968

3,368,318
THERMALLY EXPANDABLE BARRIER
STRUCTURE
Robert H. Bennett, Jr., Los Angeles, Calif., assignor to
Douglas Aircraft Company, Inc., Santa Monica, Calif.
Filed June 5, 1964, Ser. No. 372,857
11 Claims. (Cl. 52—618)

This invention relates generally to walls and bulkheads and more particularly to vacuum tight metal barriers such as airframe and rocket wall and skin structures which are subjected, across their thickness to extremes of temperature differential.

In the development of modern high performance aircraft and rockets, it has become highly advantageous to provide high strength, relatively thin metal structures forming the outer body and skin members of the vehicle exposed to the temperature extremes of space flight conditions, and which may be exposed on their inner surfaces to the extremely low temperatures of cryogenic fuel materials such as, for example, liquid hydrogen. Such a skin structure may, therefore, be subjected on one side at a given moment to temperatures of the order of a thousand degrees Fahrenheit due to air friction or solar radiation, and at other times to temperatures approaching absolute zero while in shadow in outer space. At the same time, the opposite surface may be exposed to the temperature of a living enviornment or, in other parts of the craft, to cryogenic fuel temperatures.

Providing light weight and minimum thickness in such wall and skin structures with very low heat flux therethrough while maintaining frame strength and permitting elastic straining due to the extreme thermal stresses, obviously presents sevelly difficult problems. The severity of these problems is further aggravated by the need to seal the outer skin from any surrounding atmosphere for purposes of precluding the intrusion of moisture or other contaminants into the wall space between the fuel tank and outer skin. Moisture, or even air, could immediately freeze and form a low resistance thermal path between the skin surfaces. In addition, even a pinhole in the skin permits the influx of a blow-torch-like jet of ablating air during high frictional heating phases of flight, the resulting effect of which may, in severe cases, be the total destruction of the craft.

The outer skin area may be required to suffer expansion of the order of five percent due to thermal stress as its temperature varies between that of a shadow in in outer space and that due, for example, to severe atmospheric friction or full solar radiation. The difficulties of permitting such expansion and contraction over contoured surfaces while maintaining a vacuum tight aerodynamically adequately smooth surface are fully apparent to those artisans active in the fields of art involved here.

To the extent that these problems have been fully approached in the past, the solutions heretofore evolved have suffered serious deficiencies in one or more of the requirements outlined above. For example, typical attempts to provide such structures have resulted in wall-skin combinations which are not adequately vacuum tight and which are objectionably heavy and thick.

It is therefore an object of the present invention to provide a thermally expandable barrier system which is not subject to these and other deficiencies of the prior art.

It is another object to provide a high strength such barrier structure which is relatively thin, light weight, and capable of maintaining temperature differentials of thousands of degrees Fahrenheit.

It is another object to provide such a barrier structure, the outer metal surface of which may expand an contract in response to extreme thermal stresses over contoured, aerodynamically smooth surfaces while maintaining a continuously vacuum tight outer skin.

It is another object to provide such a wall and skin structure which, while being reliably vacuum tight, is not vulnerable to puncture due to micrometeorite impact and incidental abrasion.

It is another object to provide such a structure system which forms a thermal energy barrier substantially precluding thermal flux whether by radiation or conduction or convection.

Briefly, in accordance with the structural aspects of one example of the invention, these objects are achieved in a vehicle wall assembly, the outer skin of which is a mosaic of sheet metal panel members which cooperatively form an aerodynamic surface. The panels are laterally spaced from each other along this surface by a distance which permits their thermal contraction and expansion without affecting the shape or continuity of the cooperatively formed aerodynamic surface. Means described below are provided by which the panel members effectively telescope towards and away from each other during, respectively, the expansion and contraction of the mosaic metal skin.

The panel mosaic members are mounted in a non-aerodynamic sub-skin structure which forms the vacuum seal while effectively expanding and contracting in two orthogonal directions along the surface of the wall. In this example, the sub-skin is segmented into a system of rigid panels, each of which is disposed in juxtaposition with an associated panel member of the outer skin. The junction of adjacent ones of the sub-skin panels is formed by accordian like convoluted or expandable pleat members disposed between the contiguous edges of the adjacent panels.

Where orthogonal ones of the convoluted or expandable members would otherwise intersect, a two dimensionally expandable metal expansion unit is provided. The expansion unit is formed by longitudinal end extension portions of the pleat members which, as they merge with each other, diverge from the outer skin surface to form a pyramidal, hat-like member the plane of the base of which is contiguously juxtaposed to the plane of the skin surface. In effect, the periphery of the base of the pyramidal hat is affixed to four intersecting sub-skin panel members and may be displaced inwardly or outwardly toward the axis or altitude of the pyramid as the panels expand or contract. Thusly, the sub-skin expansion and contraction is absorbed or relieved in the three dimensional flexing of the pyramidal expansion unit.

The sub-skin panels with their expansion pleats and pyramidal units are covered by the mosaic panel members of the outer metal skin each of which is affixed to and supported by a respective one of the sub-skin panels. The sub-skin structure is in turn supported by the vehicle frame system which is disposed between, in this example, the liquid fuel tanks and the sub-skin structure.

The structural, thermally insulating connection between the frame system and the sub-skin structure is provided by light weight columns rigidly affixed to the frame system and attached to the sub-skin structure in a manner described in detail below, which permits a degree of sheer strain relief as the sub-skin structure shifts laterally with its thermal expansion or contraction. The columns each include a length of highly thermally resistive material such as a thin-walled cylinder of zirconia ceramic or a very thin-walled metal cylinder.

Also interposed between the frame system and the sub-skin structure is a heat energy radiation shield which, in this example, is a thin, rigid insulator sheet containing a plurality of plated or foil layers of metal having highly reflective surfaces. The radiation shield is supported from the columns and shields the frame system from the thermal radiation from the skin structures of the vehicle, thusly minimizing the thermal strains to which the frame system is exposed.

Further details of these and other novel features and their principles of assembly and operation as well as additional objects and advantages of the invention, will become apparent and be best understood from a consideration of the following description taken in connection with the accompanying drawings which are all presented by way of illustrative example only, and in which.

Figure 1:
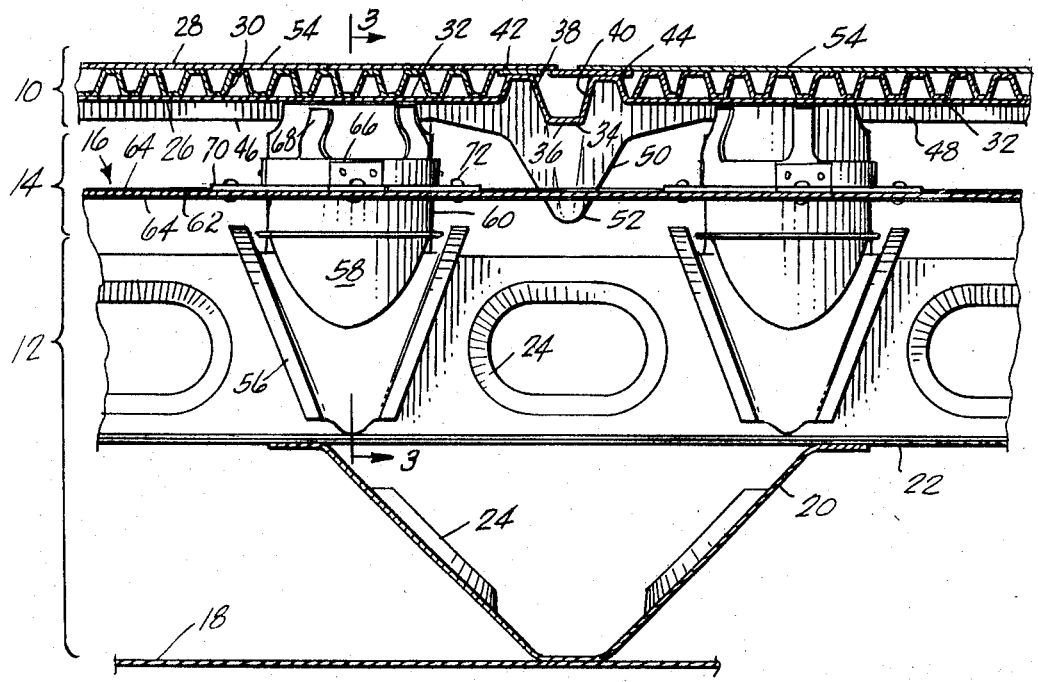
FIG. 1 is a sectional view of a portion of an example of a thermally expandable barrier structure system, constructed in accordance with the principles of the present invention, and viewed along a predetermined direction.

With specific reference now to the figures in detail, it is stressed that the particulars shown are by way of example and for purposes of illustrative discussion only, and are presented in the cause of providing what is believed to be the most useful and readily understood description of the prnciples and structural concepts of the invention. In this regard, no attempt is made to show or describe structural details of the apparatus in more detail than is necessary for a fundamental understanding of the invention, the description taken with the drawing making apparent to those skilled in the art, how the several forms of the invention may be embodied in practice. Specifically, the detailed showing is not to be taken as a limitation upon the scope of the invention which is defined by the appended claims forming, along with the drawings, a part of this specification.

In the sectional representation of FIG. 1, the composite expandable sheathing structure is indicated generally at 10; the base structure at 12; lateral strain relieving supports therebetween at 14; and a radiation shield at 16. In the particular example of the invention shown here for purposes of illustration, the barrier structure system may be considered an inner wall, frame structure, and sealed expandable outer skin of a flight craft designed for extraatmospheric as well as high velocity atmospheric utilizations. A prime specific object in such an embodiment is to provide a vacuum tight chamber between an inner wall 18 and the outer sheathing 10 while isolating all the base structure 12 from thermal stresses and any resulting distortion of the more rigid structure 12.

In this example, the inner wall 18 constitutes the boundary of a liquid hydrogen fuel tank the temperature of which is normally maintained at approximately −423 degrees Fahrenheit. A pattern of orthogonally arranged frame channel members including an inner longeron 20 and an outer longeron 22 are affixed by spotweldings and other metallurgical bonding to and in a supporting and bracing relationship with the wall 18. It may be noted that in some constructed embodiments similar to that represented in FIG. 1, the fuel tank skin (wall 18) is disposed between the inner and outer longerons 20, 22. The latter arrangement has for some applications, certain constructional advantages, however, it is, for purposes of definition and description of the invention, substantially equivalent to that shown in the figures. The orthogonally arranged longerons are also attached supportingly to each other at their crossover points by welding means, not shown, for purposes of stiffening the composite structure. For purposes of optimizing the weight versus strength characteristics of the longerons, they may be provided with circular or elongated openings 24 with the edges of the remaining aperture being pressed into a frusto-conical formation for additional rigidity of the longeron members.

Spaced outwardly from the longeron members and supported thereon by the lateral strain relieving supports 14, the location and structure of which will be described below, is the sheathing structure 10. The sheathing is made up basically of an inner vacuum tight sub-skin 26 and a mosaic outer skin 28 with a corrugated or convoluted sheet 30 affixed therebetween as a stiffener element. The sub-skin 26 may be considered as being made up of a plurality of square or otherwise polygonal planar sheets 32 which are joined together along a major portion of their contiguous edges by an expansion pleat portion 34. The pleat portion in this example, comprises three elongate convolutions, one thereof, convolution 36, constitutes a fold in the metal panel toward the inner wall 18 while a pair of juxtaposed ones, convolutions 38, 40, each serve in part to form the side walls of the elongate convolution 36 and which extend toward the mosaic outer skin 28 with respect to the general plane or surface of the sub-skin 26.

There is no non-yielding structure disposed between the convolutions of the expansion pleat portion 34, consequently it may be seen that expansion of the sub-skin planar sheets 32 due to an increase in heat may be relieved by the convolutions of the expansion pleat portion 34 being displaced toward their mutual centerline, or elongate axis of symmetry. Similarly contraction of the sub-skin planar sheets 32 due to a decrease in their temperature may be absorbed or relieved by the effective transverse spreading of the convolutions of the expansion pleat portion 34. It may be seen that with the proper choice of alloy and sheet thickness of the sub-skin 26, this flexing thereof may be accomplished rapidly and repetitively without deleterious non-elastic distortions or other straining of the sub-skin portions.

The dimension of the corrugated or convoluted stiffening sheet 30 in the direction normal to the sub-skin 26, is substantially constant and is chosen to be greater than the height of the convolutions 38, 40 above the sub-skin sheets 32 by the thickness of a set of closure plates 42, 44. The closure plates may be welded or otherwise bonded to the outermost edges of their respective pleat portion convolutions in a manner to be disposed parallel to the plane of the sub-skin sheets 32 whereby they, in cooperation with the outermost edges of the convolutions of the corrugated stiffening sheet 30, define a surface over which the mosaic outer skin 28 may be applied. It may be noted that the closure plate 44 extends laterally toward the closure plate 42 well past the axis of symmetry of the pleat portion 34. It may also be noted that the minimum spacing of the set of closure plates 42, 44 is adequate to permit the maximum required expansion of the sheathing structure 10 without deleterious distortions thereof.

As mentioned above, the planar sheets 32 of the sub-skin structure are in this example square and are provided with flexing expansion means along their edges orthogonal to those shown on end in FIG. 1 and which are formed adjacently to the expansion pleat portions 34. In the view of FIG. 1, a pair of expansion pleat portions 46, 48 disposed orthogonally to the expansion pleat portion 34 are shown in elevation. Where the expansion pleat portions 34, 46, 48 would otherwise meet, or may be said to meet virtually, a pyramidal hat-like expansion unit 50 is formed. The structure of the unit 50 will be described in more detail in connection with a subsequent figure, however it may be noted that, in essence, it consists of a smooth transitional termination of each of the elongate convolutions and other surfaces of the expansion pleat portions and permits them ultimately to terminate smoothly and continuously in a convergent cup portion 52 which forms the apex of the pyramidal expansion unit 50.

A mosaic pattern of outer skin panels 54 are affixed to the corrugated stiffening sheet 30 in a juxtaposed relationship with the planar sheets 32 of the inner vacuum tight sub-skin 26. Each of the metal skin panels 54 extends laterally beyond the periphery of its respective sub-skin sheet 32 and lays over the closure plates 42, 44 which are affixed to its respective expansion sheet convolutions 38, 40. The skin panels 54 are laterally spaced from each other over the axis of symmetry of the inwardly extending convolution 36 with a magnitude of spacing which permits the required maximum expansion of the skin panels without causing their deleterious distortion. Furthermore, the relationship between the magnitude of spacing between the skin panels 54 and the lateral width of the closure plate 44 is selected so that under all conditions of expansion and contraction the spacing between the outer skin panels is effectively closed slidingly by the closure panel 44. It may be noted that the closure plate 42 does not function in any direct way in this example to aid in the closure of the gap between the skin panels 54. Its provision is primarily for constructional advantages and symmetry of structure.

As mentioned above, in general terms, the sheathing structure 10 is secured in a lateral strain relieving support relationship to the base of structure 12 by the supports 14. These supports comprise a flanged bracket 56 which has a contour conforming, in saddle like fashion, to the outer surface of the outer longeron 22. These brackets, as described below, are typically centered along the expansion pleat portions 46 and 48. It will become apparent that in this presently preferred embodiment of the invention the outer longerons 22 are provided in an array of substantially parallel members with individual ones thereof being disposed along a line of division between adjacent ones of the outer skin panels 54. This relationship is shown more clearly in FIG. 2. A column retaining bracket portion 58 is affixed also saddle like to the bracket 56 in a manner, described more clearly below, to retain and support a thermally resistive supporting column 60. The column in this example is composed of zirconia ceramic which is relatively strong with regard to compressive stresses and has a very low thermal conductivity. The cylindrical column is hollow and has a relatively thin wall. It should be noted at this point that there is small need for requiring considerable tensile strength in the supporting columns 60, since their intraskin environment is preferably always a vacuum so that there is never a net tensile stress applied to the columns.

The radiation shield 16 is formed of a large thin walled thermally insulating rigid septum panel 62 to which is applied, as by plating or foil, layers 64 of highly reflective metal such as, in a preferred embodiment, non-corrosive and brightly finished gold. The panel 62 is foraminated to permit the passage therethrough of the supporting columns 60 and are supported thereon by a collar member 66 having radially inwardly spring biased tabs 68 which bear frictionally against the outer surface of the supporting column 60. Another set of tabs 70, these extending radially outwardly from the collar member 66, are secured supportingly to the panel 62 as by means of a plurality of rivets 72 as shown.

Figure 2:
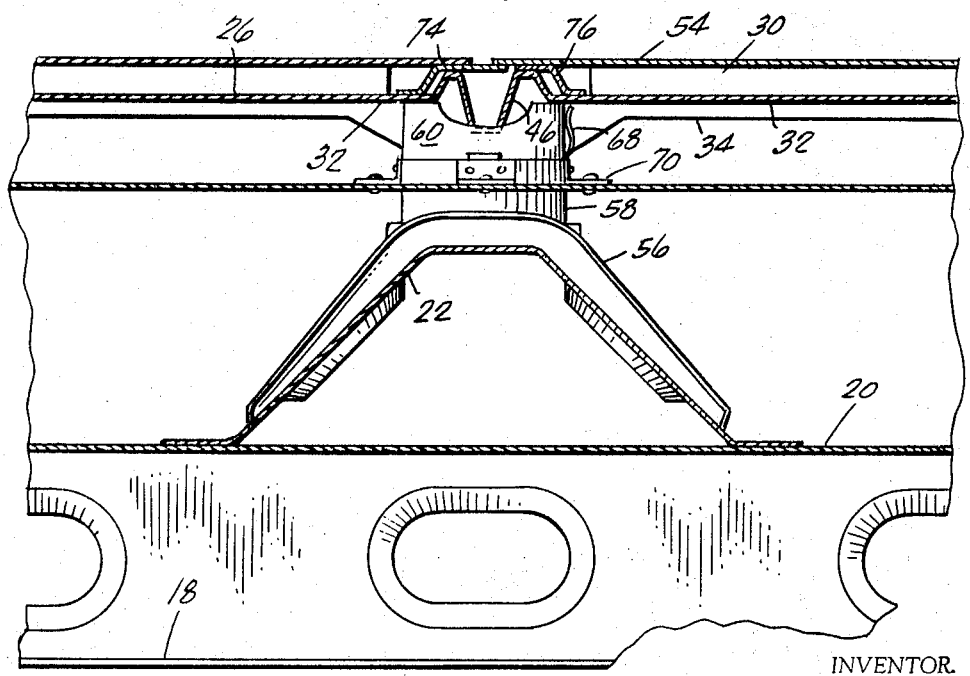
FIG. 2 is a sectional view like that of FIG. 1, viewed, however, along a direction perpendicular to said predetermined direction.

Referring to FIG. 2, the structure depicted in FIG. 1 is again illustrated, but in this view the section of presentation is taken looking along the expansion pleat 46 with the pleat portion 34 shown in side elevation. Similarly, the convolutions of the corrugated stiffening sheet 30 are shown in side elevation rather than in section as in FIG. 1. The outer skin panels 54 are again shown in their spaced mosaic pattern arrangement with their lateral spacing disposed approximately over the centerline of the central convolution of the expansion pleat 46. The set of closure plates 75, 76 are mounted, similarly to their orthogonal counterparts shown in FIG. 1, onto the outer convolutions of the pleat portion 46 in a manner to contact slidingly the under surfaces of their respective outer skin panels 54 while substantially preserving the aerodynamically smooth surface of the outer skin members. For greater strength and for constructional advantage, the outboard edges of the closure plates 74, 76 may be returned and secured to the planar sheets 32 of the inner sub-skin 26.

The supporting column 60 and the saddle bracket assembly 56, 58 and their relationship to the outer longeron 22 are illustrated clearly in the figure particularly when viewed in conjunction with the orthogonally oriented view of FIG. 1. Again the outer longeron 22 is shown secured to the inner longeron 20 at its intersections therewith; and the inner longeron 20 is secured supportingly to the inner wall 18.

Figure 3:
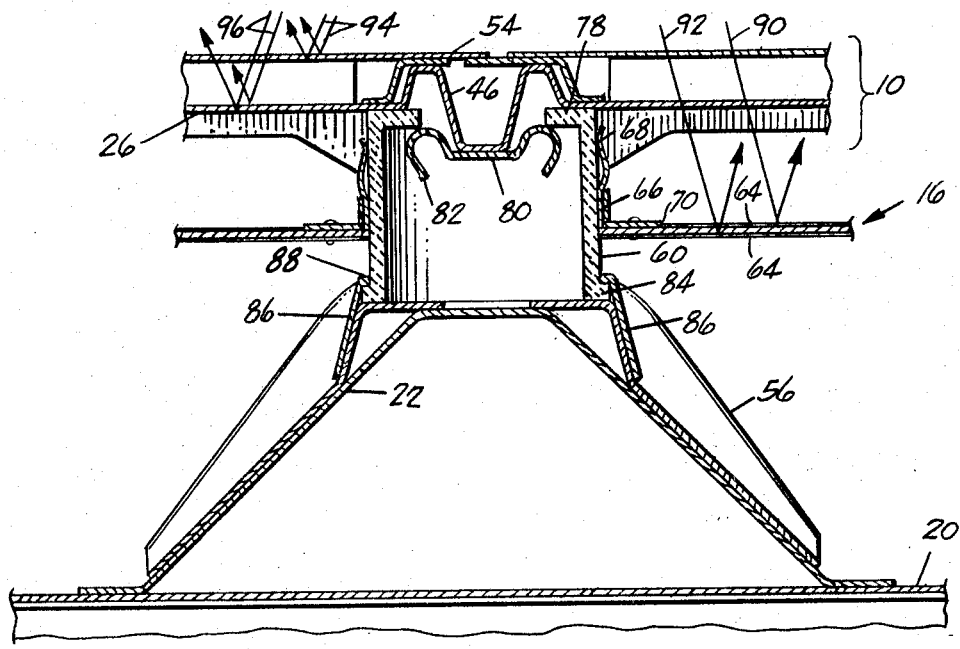
FIG. 3 is a sectional view like that of FIG. 1 taken along the lines 3—3 of FIG. 2.

Referring to FIG. 3, the representation of FIG. 2 is for the most part repeated in enlarged detail by way of a sectional view taken through the cylindrical centerline of the particular supporting column 60 shown in FIG. 2. At the upwardly or outwardly extending end of the column 60, a radially inwardly directed retaining flange 78 is provided integrally with the cylindrical body portion of the column 60. A spring metal retaining clip 80 bonded to the innermost portion of the center convolution of the expansion pleat portion 46 is provided with upwardly and outwardly biased spring tabs 82 which engage the inner, under surfaces of the retaining flange 78 thereby securing the sheathing structure 10 to the supporting columns 60. The bottom or inner end of the supporting column 60 is, in this example, provided with a radially outwardly extending retaining flange 84 which is retained fixedly downwardly against the saddle bracket assembly by a retaining bracket portion 86 having an inwardly directed retaining ledge 88 which directly engages the retaining flange 84 of the column 60. The retaining bracket portion 86 may be welded or otherwise metallurgically bonded to the flanged bracket 56 which is in turn bonded to and supported by the outer longeron 22. Again the inner longeron 20 is supportingly bonded to the outer longeron at its orthogonal intersections therewith.

The radiation shield 16 is shown in its supported relationship with the supporting column 60 by means of the collar member 66 and its tabs 68, 70. The radiation shielding effect of the radiation shield 16 is indicated by the incident vectors 90, 92 which represent radiated thermal energy passing through the sheathing structure 10 and being reflected from, respectively, the outer and inner metallic reflecting layers 64. Similarly, the vectors 94, 96 indicate that a beneficial magnitude of the incident thermal energy is reflected from the inner and outer surfaces of, respectively, the outer skin panels 54 and the sub-skin 26.

Figure 4:
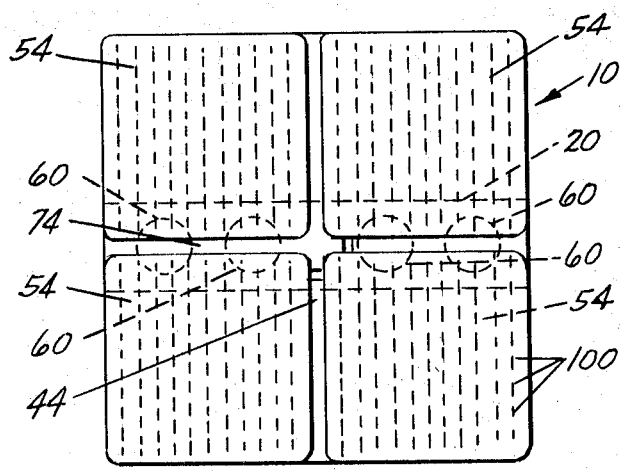
FIG. 4 is a plan view of a portion of a thermally expandable wall and skin structure according to the invention.

In FIG. 4 a portion of the sheathing structure 10 as viewed from outside the craft is shown in a plan presentation. In this view four mosaically arranged outer skin panels 54 are shown in their contiguous, laterally spaced relationship. The rows of welding dimples 100 indicate the manner of securing the plates 54 to the corrugated stiffening sheet 30, not shown, and the orientation of the individual convolutions thereof with respect to the mosaic pattern of the panels 54. Between the two left hand, as viewed in the drawing, outer skin panels 54 a portion of the closure plate 74 may be seen, while between the two lower panels 54 a portion of the closure plate 44 may be seen. The outer longeron 22 with four supporting columns 60 mounted thereon is indicated in the figure as running below and parallel to the closure plate 74 and transversely to the direction of the corrugations of the stiffening sheet 30. From the representation of FIG. 4, it is apparent that the outer skin panels 54 may expand and contract due to exposure to different thermal conditions by increasing and decreasing the magnitude of their lateral spacing without suffering deleterious distortion effects and while maintaining a substantially smooth and continuous aerodynamic surface.

Figure 5:
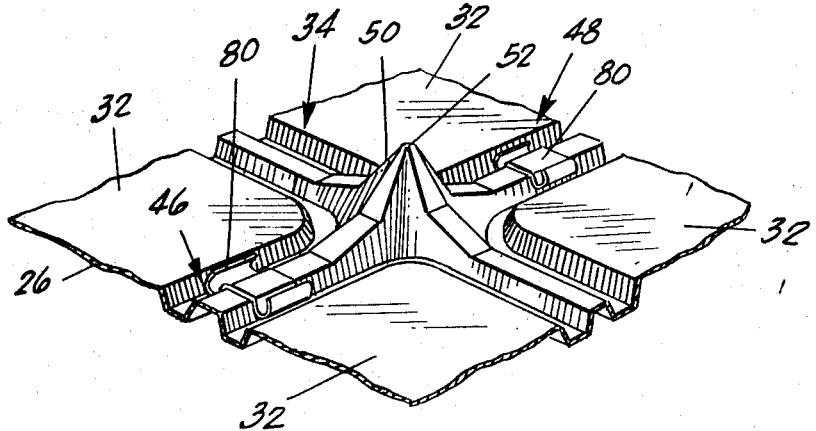
FIG. 5 is a perspective view showing the under, or inner, surface of an example of a portion of the thermally expandable, vacuum tight sub-skin constructed in accordance with the principles of the present invention.

Referring to FIG. 5, a cut away portion of the inner vacuum tight sub-skin 26 is illustrated. In this view, the planar sheets 32 and the convoluted expansion pleat portions 34, 46, 48 are shown as integral continuous and vacuum tight skin structure. The elongate convoluted portions of the expansion pleats all converge at their virtual intersection to form a smoothly transitioned pyramidal expansion unit 50 which is itself terminated in the convergent cup portion 52. It may be noted that in forming the transitional pyramidal unit 50, the periphery of its base may be considered as lying approximately in the plane of the sub-skin structure 26. Because of the transition formed by the convergent convolutions of the expansion pleat portions, the pyramidal expansion unit is formed of side surfaces which may be considered to be pleated or fluted. It is thus intuitively obvious that the expansion and contraction of the planar panels 32 symmetrically toward and away from the normal axis of the pyramidal unit 50 is absorbed or relieved by the inward and outward flexing of the base periphery of the pyramidal unit which is translated to some extent into an expansion or contraction of the effective pyramidal altitude of the expansion unit. The moving planar members are constrained to each other in a manner that permits this expansion by infinitesimal changes of length of these members. These members contract or lengthen to permit motion of the panels.

Positioned along the central convolution of the expansion pleat portions 46 and 48 symmetrically contiguous to the base portions of the pyramidal unit 50 are shown a pair of the spring metal retaining clips 80 which engage the retaining flanges of respective ones of the lateral strain relieving supports 14, not shown.

Figure 6:
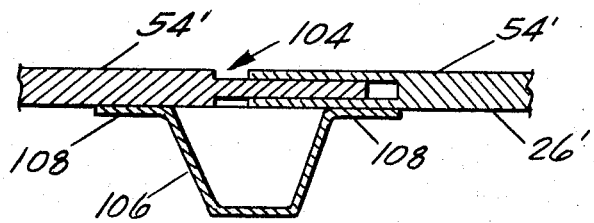
FIG. 6 is a sectional view of a portion of an alternative example of the outer skin of a thermally expandable wall structure of the invention.

In FIG. 6 an alternative example of the invention is illustrated in which the outer skin panels 54' are provided with mating tongue and groove closure plate devices 104 and in which the inner vacuum tight sub-skin 26' is formed integrally with the outer skin panels 54'. In this example the inner sub-skin 26' is formed as the inner surface of the outer skin plates 54' which have a thickness of dimension adequate to provide the required stiffness without the incorporation of a sandwiched corrugated stiffening sheet between the two surfaces. The inner surface is maintained vacuum tight by an expansion channel 106 which is disposed in longitudinal alignment with the tongue and groove closure plate device 104 and is sealed to the adjacently disposed skin panels 54' in a manner to permit the lateral flexing of the channel 106 while maintaining the telescopically engaged closure plate device 104 effectively vacuum tight.

In this example, the expansion channel 106 is shown as a single elongate trough; however in other examples of this embodiment, the channel may have a plurality of convolutions to permit greater flexibility in lateral expansion and to minimize metals fatigue. However, in any event, the elongate surfaces of the expansion channel are all transitionally terminated in a pyramidal expansion unit, not shown, similar to that of the previous figures where the skin panels 54' and, therefore, the expansion channels 106 intersect.

There have thus been disclosed and described a number of examples of a thermally expandable barrier structure system which exhibits the advantages and achieves the objects set forth hereinabove.

What is claimed is:
1. Thermally expandable barrier system comprising:
   a base body structure;
   thermal energy flow resistant column means supported by said body structure and extending outwardly therefrom;
   sealing layer metal panels arranged in a mosaic pattern over at least a portion of said body structure, said panels being polygonal with respective edges of adjacent ones thereof lying contiguously to one another;
   metallic expansion pleat means having convoluted pleats and elongate edges parallel thereto and having overall flexing ability in the direction transverse thereto and being disposed between adjacent ones of the contiguous said edges of said panels and being sealed thereto to provide a vacuum tight laterally expandable surface in cooperation therewith;
   metallic expansion, thin wall pyramidal unit disposed in the region of a virtual intersection of a plurality of said expansion pleat means, said pyramidal unit comprising an apex cup portion disposed toward said base body structure with its convex surface exposed theretoward and having flexible side sheet transition portions extending between said cup portion and the convoluted surfaces of said expansion pleat means, said transition portions being integrally affixed in a vacuum tight manner to each other and to said cup portion and to the elongate convoluted surfaces of said sealing layer metal panels; and
   laterally closely spaced skin layer metal panels and means for affixing them to the outer surface of said sealing layer panels in a superposed relation therewith to form a mosaic expandable skin for said body structure, the periphery of said superposed skin layer panels being disposed over said expandable pleat means whereby lateral expansion and contraction strains of said panels are relieved and absorbed by the transverse flexing of said expansion pleat means and pyramidal expansion unit.

2. The invention according to claim 1 in which said expansion pleat means comprises a convoluted metal sheet no portion of the folds of which intersect the surface defined by said skin layer panels.

3. The invention according to claim 1 which further includes telescopically engaging, skin continuity forming means affixed to adjacent ones of the contiguously disposed edges of said skin layer metal panels.

4. The invention according to claim 1 in which said columns each comprise a thin wall tubular body having first retaining means formed at one end thereof for attachment to said sealing layer and second retaining means formed near its opposite end for attachment to said body structure, at least one of said retaining means being of a character to permit thermal stress induced lateral displacement of said sealing layer panels with respect to said body structure.

5. The invention according to claim 1 in which said means for affixing said skin layer metal panels comprises a corrugated metallic sheet interposed in a sandwich relation between associated ones of said skin layer panels and said sealing layer panels.

6. The invention according to claim 4 in which said tubular body is a hollow cylinder composed of zirconia ceramic.

7. The invention according to claim 4 in which said retaining means are at least portions of peripheral flanges formed at either end of said tubular body.

8. A thermally expandable barrier structure system for flight craft comprising:
   flight body structure;
   thermal energy flow resistant column means supported by said body structure and extending outwardly therefrom;
   sealing layer metal panels arranged in a mosaic pattern over at least a portion of said body structure, said panels being polygonal with respective edges of adjacent ones thereof lying contiguously to one another;
   metallic expansion pleat means having elongate edges and overall flexing ability in the direction transverse thereto and disposed between adjacent ones of the contiguous said edges of said panels and being sealed thereto to provide a vacuum tight, laterally expandable surface in cooperation therewith;

metallic expansion pyramidal unit disposed at the intersection of a plurality of said expnasion pleat means, said pyramidal unit comprising an apex cup portion disposed toward said body structure with its convex surface exposed thereto and having flexible transition means between said cup portion and its said expansion pleat means including a plurality of pleatingly joined side surfaces integrally affixed in a vacuum tight manner to each other and to said cup portion and to the elongate surfaces of said expansion pleat means and to the corner portions of said sealing layer metal panels, whereby lateral expansion and contraction strains of said panels are relieved by the transverse flexing of said expansion pleating means and said pyramidal expansion unit.

9. Thermally expandable barrier system comprising:
a base body structure;
thermal energy flow resistant column means supported by said body structure and extending outwardly therefrom;
sealing layer metal panels arranged in a mosaic pattern over at least a portion of said body structure, said panels being polygonal with respective edges of adjacent ones thereof lying contiguously to one another;
metallic expansion pleat means having convoluted pleats and elongate edges parallel thereto and having overall flexing ability in the direction transverse thereto and being disposed between adjacent ones of the contiguous said edges of said panels and being sealed thereto to provide a vacuum tight laterally expandable surface in cooperation therewith;
metallic expansion, thin wall cup-shaped unit disposed in the region of a virtual intersection of a plurality of said expansion pleat means, said cup-shaped unit comprising an apex portion disposed toward said base body structure with its convex surface exposed theretoward and having flexible side sheet transition portions extending between said cup portion and the convoluted surfaces of said expansion pleat means, said transition portions being integrally affixed in a vacuum tight manner to each other and to said cup portion and to the elongate convoluted surfaces of said expansion pleat means and to the corner portions of said sealing layer metal panels; and
laterally closely spaced skin layer metal panels and means for affixing them to the outer surface of said sealing layer panels in a superposed relation therewith to form a mosaic expandable skin for said body structure, the periphery of said superposed skin layer panels being disposed over said expandable pleat means whereby lateral expansion and contraction strains of said panel are relieved and absorbed by the transverse flexing of said expansion pleat means and cup-shaped expansion unit.

10. A thermally expandable barrier structure system for a body structure and comprising:
thermal energy flow resistant support means carried by the body structure and extending outwardly therefrom;
sealing layer metal panels affixed to said support means and being arranged in a mosaic pattern to define a predetermined surface portion over said body structure, said panels being polygonal with respective edges of adjacent ones thereof lying contiguously to one another;
metallic expansion pleat means having elongate edges and overall flexing ability in the direction transverse thereto and disposed between adjacent ones of the contiguous said edges of said panels and being sealed thereto to provide a vacuum tight, laterally expandable surface in cooperation therewith;
metallic expansion cup-shaped unit disposed at the intersection of a plurality of said expansion pleat means, said cup-shaped unit comprising an apex portion having flexible transition means between said apex portion and its said expansion pleat means including a plurality of pleatingly joined side surfaces integrally affixed in a vacuum tight manner to each other and to said apex portion and to the elongate surface of said expansion pleat means and to the corner portions of said sealing layer metal panels, whereby lateral expansion and contraction strains of said panels are relieved by the transverse flexing of said expansion pleat means and said cup-shaped expansion unit.

11. The invention according to claim 1 which further includes radiation shield panel means for reflecting radiant thermal energy carried by said supporting column means between said base body structure and said mosaic expandable skin, said radiation shield panel means having at least one highly reflective metallic surface disposed over at least a major portion thereof.

References Cited
UNITED STATES PATENTS

| | | | |
|---|---|---|---|
| 2,900,965 | 8/1959 | Witzke | 52—573 X |
| 2,986,247 | 5/1961 | Schmitt et al. | 52—573 X |
| 3,118,523 | 1/1964 | Girot | 52—573 |
| 3,195,841 | 7/1965 | Knohn | 52—573 X |

DAVID J. WILLIAMOWSKY, *Primary Examiner.*

PETER M. CAUN, *Examiner.*